US009541922B2

(12) United States Patent
Tsujimoto et al.

(10) Patent No.: US 9,541,922 B2
(45) Date of Patent: Jan. 10, 2017

(54) VEHICLE CONTROL SYSTEM AND VEHICLE CONTROL METHOD

(71) Applicant: Daifuku Co., Ltd., Osaka-shi (JP)

(72) Inventors: Masanori Tsujimoto, Tokyo (JP); Yoshimasa Hara, Tokyo (JP); Natsuo Takagawa, Gamo-gun (JP); Toshisada Mariyama, Gamo-gun (JP); Koji Kubota, Gamo-gun (JP)

(73) Assignee: Daifuku Co., Ltd., Osaka-shi (JP)

( * ) Notice: Subject to any disclaimer, the term of this patent is extended or adjusted under 35 U.S.C. 154(b) by 369 days.

(21) Appl. No.: 14/251,794

(22) Filed: Apr. 14, 2014

(65) Prior Publication Data

US 2014/0316633 A1   Oct. 23, 2014

(30) Foreign Application Priority Data

Apr. 19, 2013 (JP) .................. 2013-088631

(51) Int. Cl.
*G05D 1/02* (2006.01)
(52) U.S. Cl.
CPC .......... *G05D 1/0223* (2013.01); *G05D 1/0227* (2013.01); *G05D 1/0244* (2013.01); *G05D 1/0261* (2013.01); *G05D 1/0272* (2013.01); *G05D 1/0274* (2013.01)
(58) Field of Classification Search
CPC .. G05D 1/0246; G05D 1/0244; G05D 1/0274; G05D 1/0227; G05D 1/0238; G05D 2201/0216; A47L 2201/04; A47L 9/2805; E21D 9/004; G01C 21/16
See application file for complete search history.

(56) References Cited

U.S. PATENT DOCUMENTS

| 8,286,122 B2* | 10/2012 | De Graeve ....... G06F 17/30241 706/20 |
| 2012/0136516 A1* | 5/2012 | Harasaki ............. G05D 1/0289 701/19 |
| 2012/0182392 A1* | 7/2012 | Kearns ................. B25J 11/009 348/46 |
| 2012/0265391 A1* | 10/2012 | Letsky ................ A01D 34/008 701/25 |
| 2014/0358349 A1* | 12/2014 | Okuda .................. B60K 6/445 701/22 |

FOREIGN PATENT DOCUMENTS

| JP | 2001154733 A | 6/2001 |
| JP | 2005067870 A | 3/2005 |
| JP | 2006113687 A | 4/2006 |
| JP | 2006127355 A | 5/2006 |

* cited by examiner

*Primary Examiner* — Thomas G Black
*Assistant Examiner* — Ana Thomas
(74) *Attorney, Agent, or Firm* — The Webb Law Firm

(57) ABSTRACT

A position measurement portion manages a measurement target area by dividing the area into a plurality of section areas, and also manages, or keeps track of, an intra-area interfering object number which is the number of interfering objects in a given section area, independently for each of the plurality of the section areas. The travel controller determines, independently for each of the plurality of section areas, if the section area is in a congested state in which the intra-area interfering object number is greater than a set upper limit number, and selects a congested area travel mode as the travel mode when the travel controller is about to cause the vehicle to travel in a section area that is determined to be in the congested state.

12 Claims, 10 Drawing Sheets

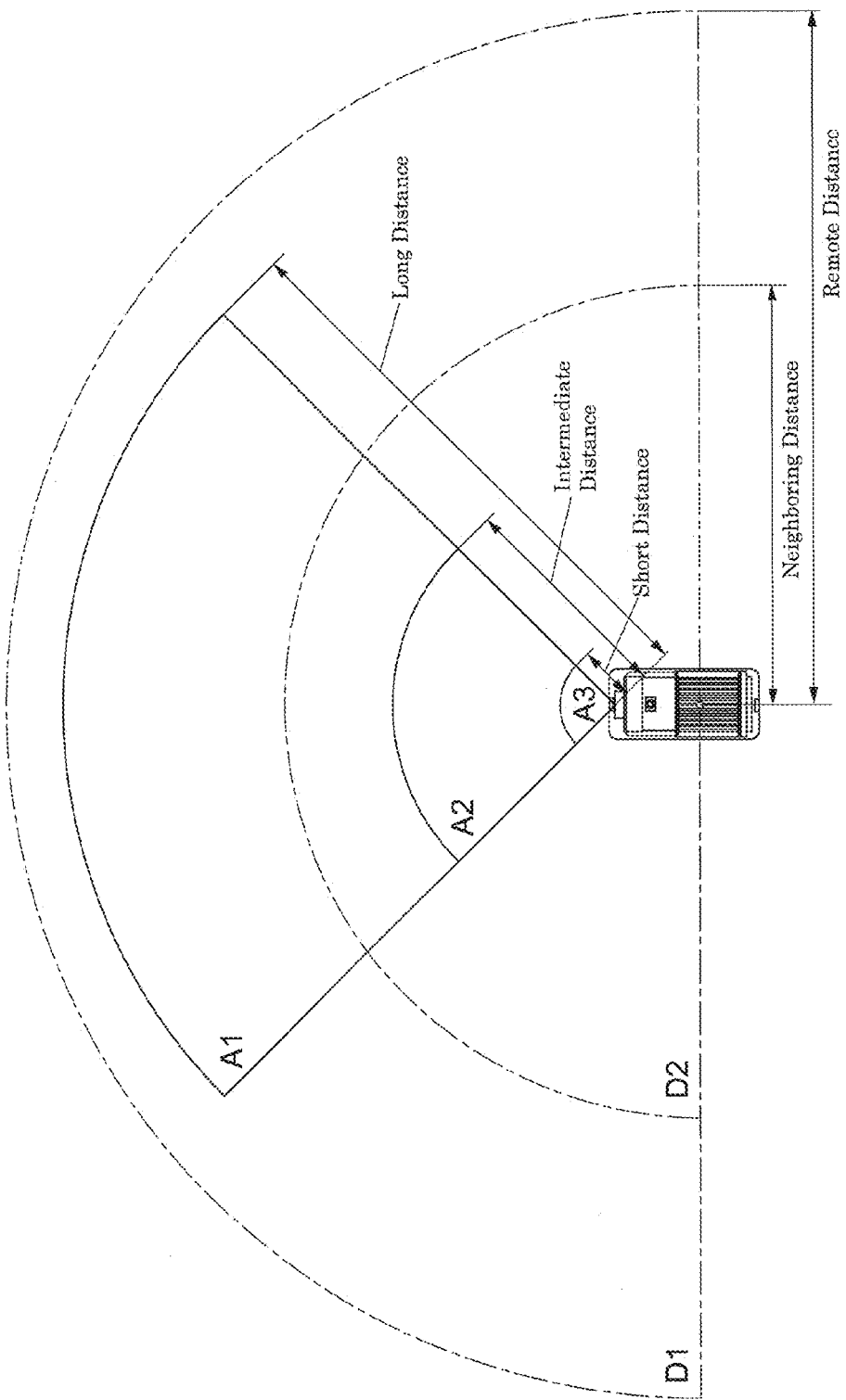

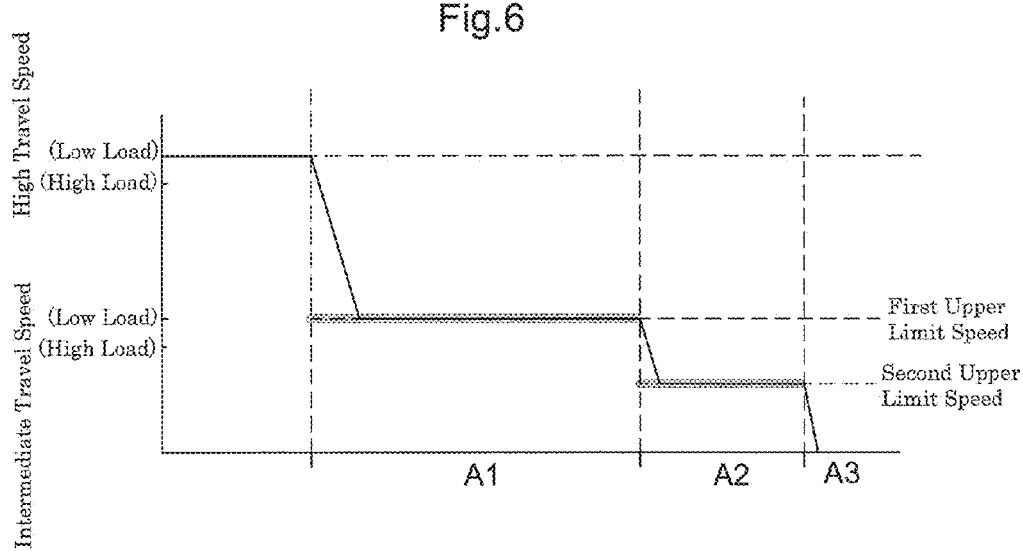
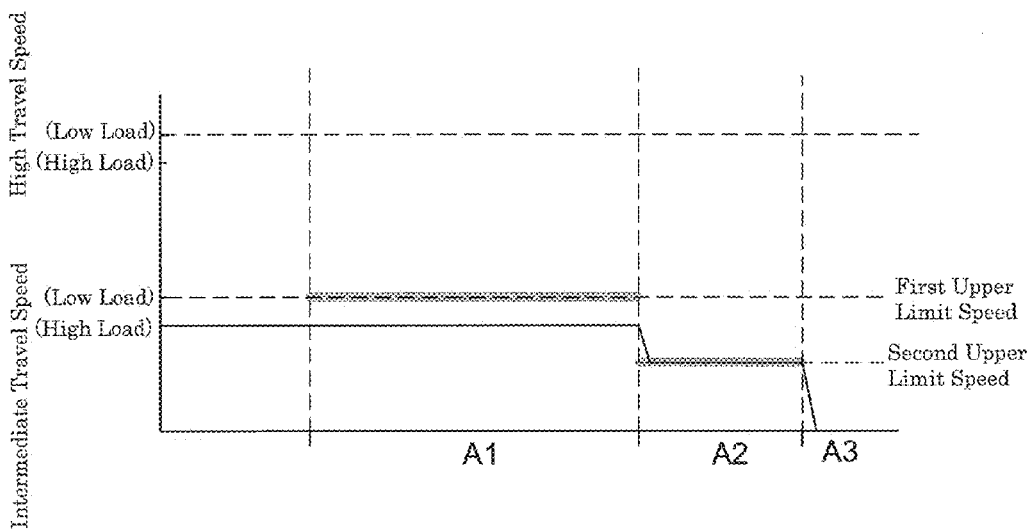

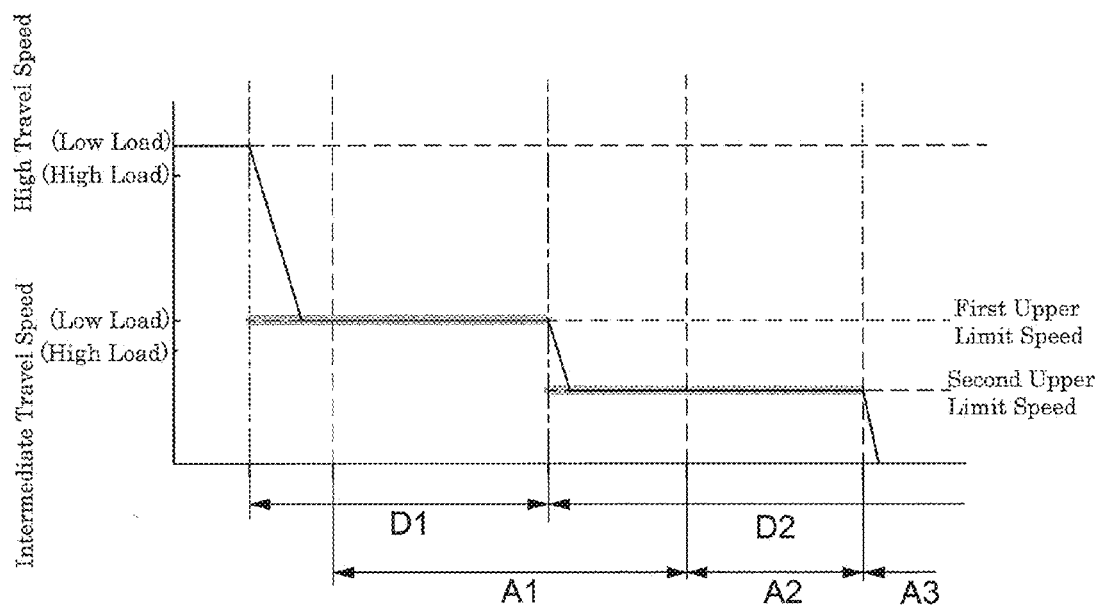

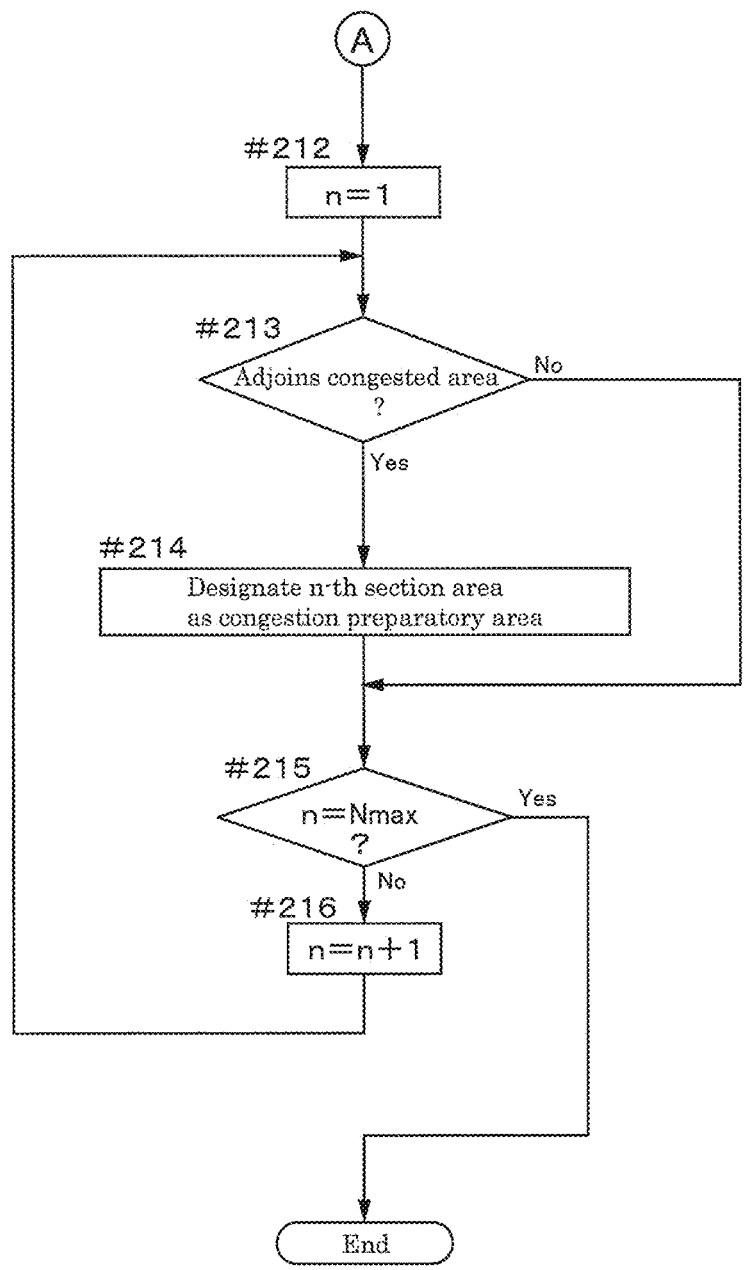

VEHICLE CONTROL SYSTEM AND VEHICLE CONTROL METHOD

CROSS-REFERENCE TO RELATED APPLICATION

This application claims priority to Japanese Patent Application No. 2013-088631 filed Apr. 19, 2013, the disclosure of which is hereby incorporated by reference in its entirety.

FIELD OF THE INVENTION

The present invention relates to a vehicle control system comprising a vehicle capable of traveling in a measurement target area, a travel controller which controls travel of the vehicle, and a position measurement portion which measures a position of the vehicle within the measurement target area and positions of a plurality of interfering objects within the measurement target area, wherein the travel controller is configured to control travel of the vehicle based on position information of the vehicle in the measurement target area and position information of the plurality of the interfering objects, measured by the position measurement portion. The present invention also relates to a vehicle control method that utilizes such vehicle control system.

BACKGROUND

An example of a vehicle control system is disclosed in Patent Document 1 (JP Publication of Application No. 2005-067870). In the vehicle control system of Patent Document 1, the position of the vehicle which can travel within a measurement target area and the position of an interfering object which can move within the measurement target area are detected by a position measurement portion. And travel of the vehicle is controlled based on the detected information from the position measurement portion to avoid interference with the interfering object.

More specifically, the vehicle control system of Patent Document 1 includes, as the position measurement portion, a laser range finder provided to the vehicle, and a plurality of reflecting plates provided at designated positions in the measurement target area, and calculates the position of the vehicle in the measurement target area based on the distance from each of the plurality of reflecting plates measured with the laser range finder. The vehicle control system of Patent Document 1 also includes, as the position measurement portion, an interfering object sensor provided to the front face of the vehicle to detect any interfering object that is approaching the vehicle, and performs a control in which, for example, the travel upper limit speed of the vehicle is set to a lower speed if and when the distance between the vehicle and the interfering object becomes less than or equal to a predetermined distance.

Another example of the position measurement portion is a system which includes a camera for capturing an image of the measurement target area, and which measures the position of each of the vehicle and a plurality of interfering objects from the captured image from the camera, as well as a system in which a wireless tag is provided to each of the vehicle and a plurality of interfering objects in the measurement target area, and in which the positions of the wireless tags are measured with a wireless position measurement portion.

SUMMARY OF THE INVENTION

However, with these position measurement portions, the amount of processing time required to measure the positions of all the interfering objects tends to increase with an increase in the number of the interfering objects; thus, there is a possibility that, for a given interfering object, the amount of time between the time the last position measurement was performed and the time a subsequent position measurement is performed (measurement cycle time) may be increased. If the interfering object is a worker, or a transported article, etc., the interfering object may move between the time the last position measurement was performed and the time a subsequent position measurement is performed; thus, it is possible that the actual position of the interfering object is displaced from its measured position. For this reason, there was a possibility that the difference between the measurement position and the actual position may become large as the measurement cycle time increases as described above; and there was a possibility that the position of each of the vehicle and the interfering objects cannot be properly managed. And when the vehicle is caused to travel in such state, the vehicle or an interfering object may be located in an unexpected location, which leads to a possibility that an interference, or collision, between the vehicle and the interfering object may not be properly avoided.

To this end, a vehicle control system is desired in which an interference between a vehicle and interfering objects can be avoided as much as possible even when there is a large number of interfering objects within the measurement target area.

A vehicle control system in accordance with the present invention comprises: a vehicle capable of traveling in a measurement target area; a travel controller which controls travel of the vehicle; a position measurement portion which measures a position of the vehicle within the measurement target area and positions of a plurality of interfering objects within the measurement target area; wherein the travel controller is configured to control travel of the vehicle based on position information of the vehicle in the measurement target area and position information of the plurality of the interfering objects, measured by the position measurement portion, wherein the position measurement portion is configured to manage the measurement target area by dividing the measurement target area into a plurality of section areas, and is configured to manage an intra-area interfering object number, which is the number of interfering objects in a section area, independently for each of the plurality of the section areas, and wherein the travel controller is configured: to control travel of the vehicle in any one of a plurality of travel modes; to determine, independently for each of the plurality of section areas, if the section area is in a congested state in which the intra-area interfering object number is greater than a set upper limit number, based on the measurement information from the position measurement portion; and to select a congested area travel mode as the travel mode when the travel controller is about to cause the vehicle to travel in the section area that is determined to be in the congested state.

Thus, the travel controller can keep track of the state of congestion for each section area by determining if the intra-area interfering object number is greater than a set upper limit number in each of the plurality of section areas based on the measurement information from the position measurement portion. And the travel controller selects a congested area travel mode as the travel mode when the travel controller is about to cause the vehicle to travel in the section area that is determined to be in the congested state because of the large number of interfering objects in a given section (i.e., a large intra-area interfering object number). That is, since the travel mode of the vehicle is changed, or switched, to a travel mode suitable for the congested state, any interference between the vehicle and any interfering object in the section area in the congested state can be properly avoided.

Therefore, a vehicle control system can be provided in which any interference between the vehicle and an interfering object can be properly avoided even when there are many interfering objects in the measurement target area.

The technical features of the vehicle control system in accordance with the present invention also apply to a vehicle control method; and such method falls within the scope of protection of the present invention. Such vehicle control method also has the functions and effects of the vehicle control system described above.

More specifically, the vehicle control method in accordance with the present invention is a method that utilizes a vehicle control system including a vehicle capable of traveling in a measurement target area, a travel controller which controls travel of the vehicle, and a position measurement portion which measures a position of the vehicle within the measurement target area and positions of a plurality of interfering objects within the measurement target area, wherein the travel controller is configured to control travel of the vehicle based on position information of the vehicle in the measurement target area and position information of the plurality of the interfering objects, measured by the position measurement portion, wherein the position measurement portion is configured to manage the measurement target area by dividing the measurement target area into a plurality of section areas, and is configured to manage an intra-area interfering object number, which is the number of interfering objects in a section area, independently for each of the plurality of the section areas. And the travel control method comprises the following steps that are performed by the travel controller: a travel control step in which travel of the vehicle is controlled in any one of a plurality of travel modes; a congested state determining step in which whether the section area is in a congested state, in which the intra-area interfering object number is greater than a set upper limit number, is determined independently for each of the plurality of section areas, based on the measurement information from the position measurement portion, wherein, in the travel control step, a congested area travel mode is selected as the travel mode when the vehicle is about to be caused to travel in the section area that is determined to be in the congested state.

Examples of preferred embodiments of the present invention are described next.

In an embodiment of the vehicle control system in accordance with the present invention, the travel controller is preferably configured to select a normal travel mode as the travel mode when the travel controller is about to cause the vehicle to travel in the section area that is determined not to be in the congested state. And the congested area travel mode is preferably a mode in which travel of the vehicle within the section area is more restricted than in the normal travel mode.

Thus, the normal travel mode is selected as the travel mode when the vehicle is about to be caused to travel in the section area that is determined not to be in the congested state. Therefore, the vehicle is allowed to travel normally in a section area in which the vehicle is unlikely to interfere with an interfering object because the section area is not in the congested state.

Therefore, a vehicle control system can be provided in which a proper travel mode can be selected depending on whether each of the plurality of section areas is in the congested state.

In an embodiment of the vehicle control system in accordance with the present invention, in the congested area travel mode, the travel controller is preferably configured to set an upper limit travel speed for the vehicle to a congestion upper limit travel speed which is less than an upper limit travel speed in the normal travel mode.

That is, when the vehicle travels in a section area in which the congested state exists, it is likely for an interfering object to be in the expected travel path of the vehicle. Therefore, when the vehicle is caused to travel in the section area in which the congested state exists, it is more likely for the vehicle to interfere with an interfering object than when the vehicle is caused to travel in a section area in which the congested state does not exist. With the arrangement described above, because the upper limit travel speed of the vehicle is set to the congestion upper limit travel speed which is less than the upper limit travel speed in the normal travel mode in the section area in which the congested state exists, any interference between the vehicle and an interfering object can be properly avoided in a section area in which the congested state exits.

In an embodiment of the vehicle control system in accordance with the present invention, the travel controller is preferably configured, in the congested area travel mode, to restrict entry of the vehicle into the section area that is determined to be in the congested state.

That is, when the vehicle travels in a section area in which the congested state exists, it is likely for an interfering object to be in an expected travel path of the vehicle. Therefore, when the vehicle is caused to travel in the section area in which the congested state exists, it is more likely for the vehicle to interfere with an interfering object than when the vehicle is caused to travel in a section area in which the congested state does not exist. With the arrangement described above, any incident of an interference between the vehicle and an interfering object can be avoided to the extent possible by restricting entry of the vehicle into the section area in which the congested state exists.

In an embodiment of the vehicle control system in accordance with the present invention, the travel controller is preferably configured to select the congested area travel mode as the travel mode when the travel controller is about to cause the vehicle to travel in the section area that satisfies a set condition with the section area that is determined to be in the congested state even if the section area in which the travel controller is about to cause the vehicle to travel is the section area that is determined not to be in the congested state.

Thus, the congested area travel mode, which is a suitable mode for the congested state, is selected as the travel mode when the vehicle is about to be caused to travel in the section area that satisfies the set condition with the section area that is determined to be in the congested state even if the section area in which the vehicle is about to be caused to travel is the section area that is determined not to be in the congested state. If this set condition is set to be that the given section area adjoins a section area that is determined to be in the congested state, a travel mode suitable for the congested state can be selected as the travel mode of the vehicle also for a section area which is not in the congested state but which may transition into the congested state because of an interfering object moving from the section area in the congested state. Thus, a vehicle control system can be provided in which any interference between the vehicle and an interfering object can be avoided more reliably when there is a measurement target area with many interfering objects.

In an embodiment of the vehicle control system in accordance with the present invention, the position measurement portion includes: wireless tags each of which can output a positioning wireless signal which is a wireless signal for position measurement, and each of which is carried by each of the vehicle and the plurality of the interfering objects; a receiving portion configured to be able to receive the positioning wireless signals from a plurality of the wireless tags that are in the measurement target area such that the receiving portion can receive the positioning wireless signal from only one wireless tag at any one time; and a position calculation portion which calculates positions of the wireless tags in the measurement target area based on received information from the receiving portion, requiring a set processing time to calculate the position of any one of the wireless tags wherein the position measurement portion is preferably configured to measure the position of the vehicle and the plurality of the interfering objects at each elapse of a processing time by repeatedly performing a position measurement process in which the position of each of the vehicle and the interfering objects in the measurement target area is measured at each elapse of the processing time.

That is, when the arrangement is adapted such that the positions of a vehicle and a plurality of interfering objects are measured based on the positioning wireless signal from the wireless tag provided to each of the vehicle and the plurality of interfering objects, the receiving portion which receives the positioning wireless signals from a plurality of wireless tags in the measurement target area is configured to be able to receive the positioning wireless signal from only one wireless tag at any one time. And the position calculation portion which calculates the positions of the wireless tags in the measurement target area requires a set processing time to calculate the position of any one of the wireless tags based on the received information from the receiving portion. Therefore, the greater the number of wireless tags, the longer it takes to measure the positions of all of the plurality of wireless tags in the measurement target area.

And the position measurement portion updates and manages, or keeps track of, the newest position information for each wireless tag by repeatedly performing the position measurement process at each elapse of a processing time. Thus, the longer the time required to measure the positions of all of the plurality of wireless tags that are in the measurement target area becomes, the more likely it becomes for the difference, or discrepancy, to occur between the managed position information of the wireless tags and the actual positions of the wireless tags.

In an arrangement incorporating such a position measurement portion, since there would be a difference, or discrepancy, between the managed position information for the wireless tags and the actual positions of the wireless tags when the congested state occurs, it may become impossible to properly manage the positions of the vehicle and the positions of the interfering objects; thus, there is a possibility that any interference between the vehicle and an interfering object may not be properly avoided. To this end, by utilizing the vehicle control system described above when adapting a wireless position measurement portion as described above, it becomes possible to properly avoid any interference between the vehicle and an interfering object in the section area in the congested state.

In an embodiment of the vehicle control system in accordance with the present invention, the receiving portion preferably includes a plurality of wireless receivers, wherein each of the section area is arranged to be a section reception area which is a reception target area for a plurality of the wireless receivers. And the position calculation portion is preferably configured to calculate the position of each of the vehicle and the interfering objects, for each of the section reception areas.

That is, since each of the section area is arranged to be a section reception area which is a reception target area for a plurality of the wireless receivers, the positioning wireless signals from the wireless tags are received by the plurality of wireless receivers for each reception target area; and, the number of the wireless tags can be calculated properly for each section reception area based on the positioning wireless signals.

In an embodiment of the vehicle control system in accordance with the present invention, the interfering object is preferably a movable body that is movable within the measurement target area.

That is, when the interfering objects are movable bodies which move within the measurement target area, there is a possibility that a difference, or discrepancy, may occur between the managed position information for the wireless tags and the actual positions of the wireless tags when the measurement cycle time required to perform all the position measurements for the plurality of movable bodies becomes long; thus, there is a possibility that the position of the vehicle and the positions of the interfering objects cannot be properly managed, or kept track of.

With the arrangement described above, it becomes possible to properly avoid any interference between the vehicle and a movable body even when a difference, or discrepancy, occurs between the managed position information for the wireless tags and the actual positions of the wireless tags due to the movements of the interfering objects, because the congested area travel mode is selected as the travel mode when the vehicle is about to be caused to travel in the section area that is determined to be in the congested state.

In an embodiment of the vehicle control method in accordance with the present invention, in the travel control step, a normal travel mode is preferably selected as the travel mode when the vehicle is about to be caused to travel in the section area that is determined not to be in the congested state, wherein the congested area travel mode is preferably a mode in which travel of the vehicle within the section area is more restricted than in the normal travel mode.

In an embodiment of the vehicle control method in accordance with the present invention, in the travel control step, in the congested area travel mode, an upper limit travel speed for the vehicle is set to a congestion upper limit travel speed which is less than an upper limit travel speed in the normal travel mode.

In an embodiment of the vehicle control method in accordance with the present invention, in the travel control step, in the congested area travel mode, entry of the vehicle is preferably restricted into the section area that is determined to be in the congested state.

In an embodiment of the vehicle control method in accordance with the present invention, in the travel control step, the congested area travel mode is preferably selected as the travel mode when the vehicle is about to be caused to travel in the section area that satisfies a set condition with the section area that is determined to be in the congested state even if the section area in which the vehicle is about to be caused to travel is the section area that is determined not to be in the congested state.

In an embodiment of the vehicle control method in accordance with the present invention, the position measurement portion includes: wireless tags each of which can output a positioning wireless signal which is a wireless signal for position measurement, and each of which is carried by each of the vehicle and the plurality of the interfering objects; a receiving portion configured to be able to receive the positioning wireless signals from a plurality of the wireless tags that are in the measurement target area such that the receiving portion can receive the positioning wireless signal from only one wireless tag at any one time; and a position calculation portion which calculates positions of the wireless tags in the measurement target area based on received information from the receiving portion, requiring a set processing time to calculate the position of any one of the wireless tags, wherein the vehicle control method preferably further comprises, as a step that is performed by the position calculation portion, a position measurement step in which the position of the vehicle and the plurality of the interfering objects is measured at each elapse of a processing time by repeatedly performing a position measurement process in which the position of each of the vehicle and the interfering objects in the measurement target area is measured at each elapse of the processing time.

In an embodiment of the vehicle control method in accordance with the present invention, the receiving portion preferably includes a plurality of wireless receivers, wherein each of the section area is preferably a section reception area which is a reception target area for a plurality of the wireless receivers, and wherein, in the position measurement step, the position of each of the vehicle and the interfering objects is preferably calculated for each of the section reception areas.

In an embodiment of the vehicle control method in accordance with the present invention, the interfering object is preferably a movable body that is movable within the measurement target area.

BRIEF DESCRIPTION OF THE DRAWINGS

FIG. 5 shows the ranges in which the target travel speed of the article transport vehicle is set and changed, FIG. 6 is a time chart which shows changes in the target travel speed of the article transport vehicle, FIG. 7 is a time chart which shows changes in the target travel speed of the article transport vehicle, FIG. 8 is a time chart which shows changes in the target travel speed of the article transport vehicle, FIG. 12 is a flow chart showing how the travel control mode is selected in the second embodiment.

DETAILED DESCRIPTION

First Embodiment

The first embodiment in accordance with the present invention is described next with reference to the drawings.

Figure 1:
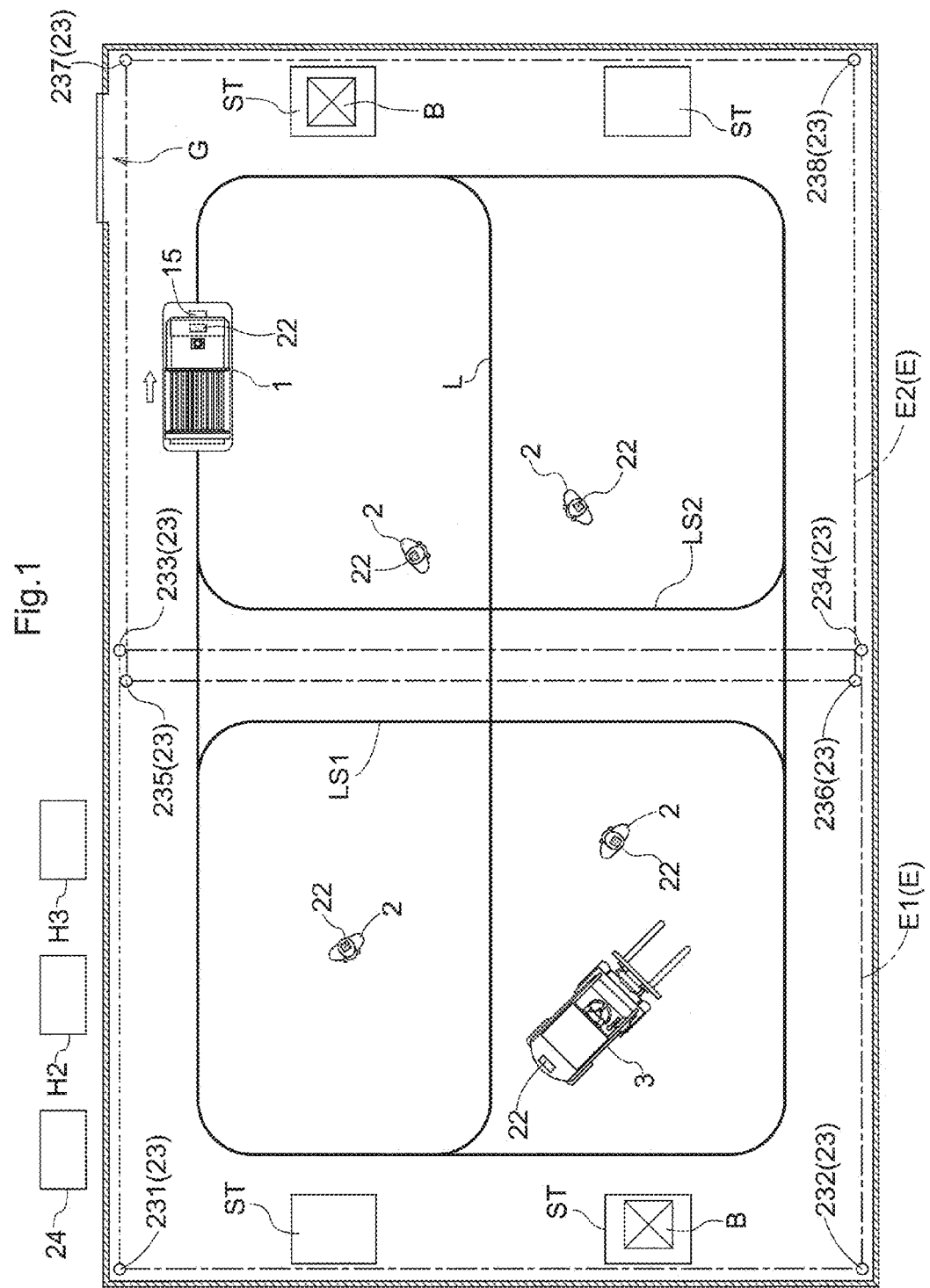
FIG. 1 is a plan view of an article transport facility equipped with a vehicle control system of the first embodiment.

As shown in FIG. 1, an article transport facility includes a plurality of stations ST, each of which functions as an article transfer location provided at a side of the travel path L, and an article transport vehicle 1 configured to travel, or capable of traveling, on the floor and along the travel path L extending by way of, or along, the plurality of stations ST. And the article transport vehicle 1 travels autonomously along the travel path L to transport articles B (pallets as well as goods and things received and supported by the pallets in the present example) among the plurality of stations ST one article B at a time. In the present embodiment, the article transport vehicle 1 corresponds to the "vehicle" of the present invention.

In addition, in the article transport facility, workers 2 from outside walk on the floor and a fork lift truck 3, operated by the onboard driver, also travels on the floor.

While the travel path L is shown with solid lines in FIG. 1, it only represents a virtual travel path along which the article transport vehicle 1 should travel. And no rail is installed for guiding the article transport vehicle 1.

Figure 2:
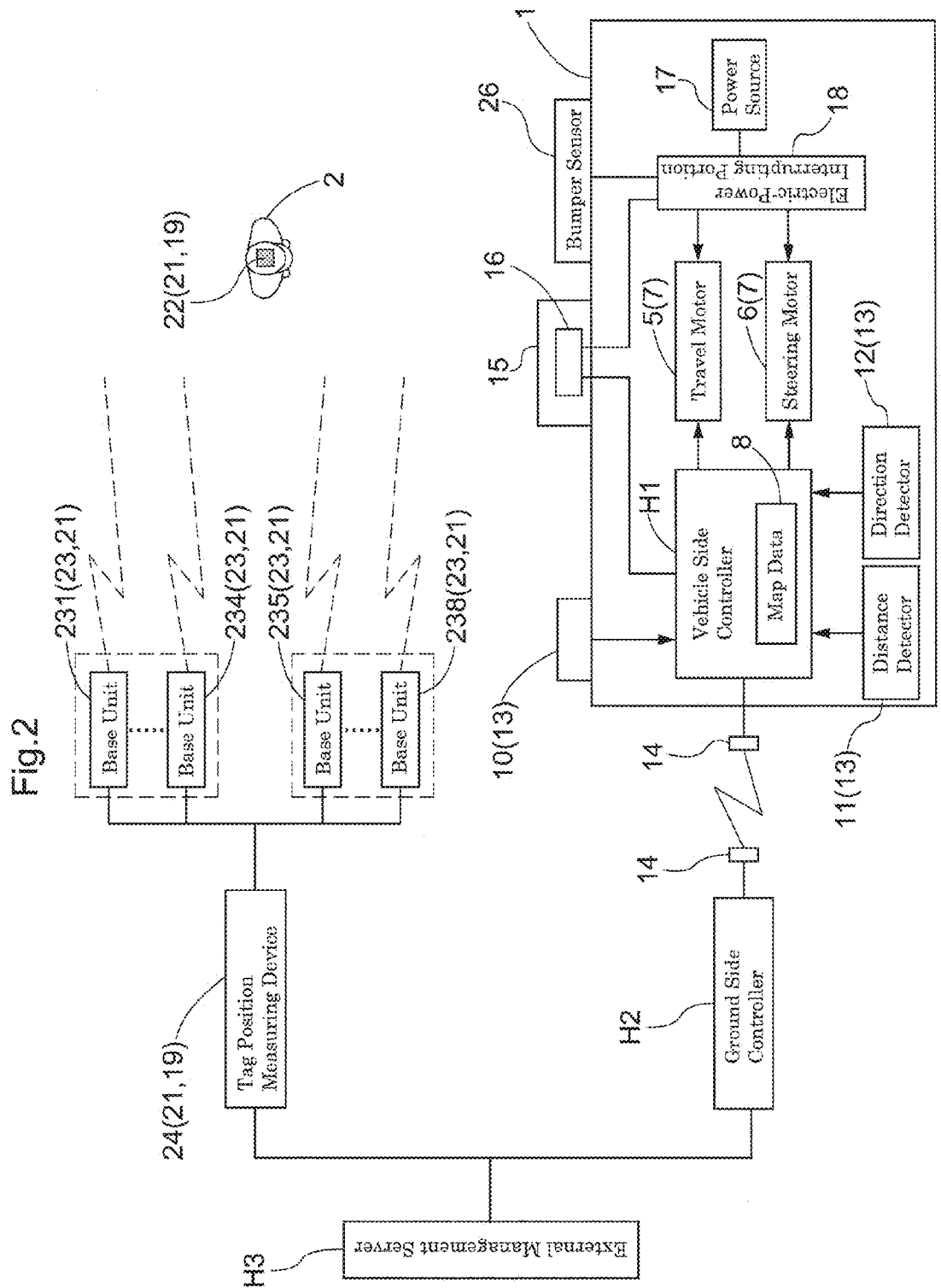
FIG. 2 is a control block diagram for the article transport facility.

As shown in FIG. 2, the article transport vehicle 1 includes a travel motor 5 for drivingly rotating driven travel wheels (not shown), and a steering motor 6 for causing freely rotatable travel wheels (not shown) to be pivoted about a vertical axis (axis extending along a vertical direction) to change the direction of the freely rotatable travel wheels. The article transport vehicle 1 is configured to travel as the travel motor 5 drivingly rotates the driven travel wheels, and to change its travel direction as the steering motor 6 changes the direction of the freely rotatable travel wheels.

The travel motor 5 and the steering motor 6 define a travel actuating portion 7 whereby the article transport vehicle 1 is configured to be able to travel along the travel path L by the operation of the travel actuating portion 7.

Figure 3:
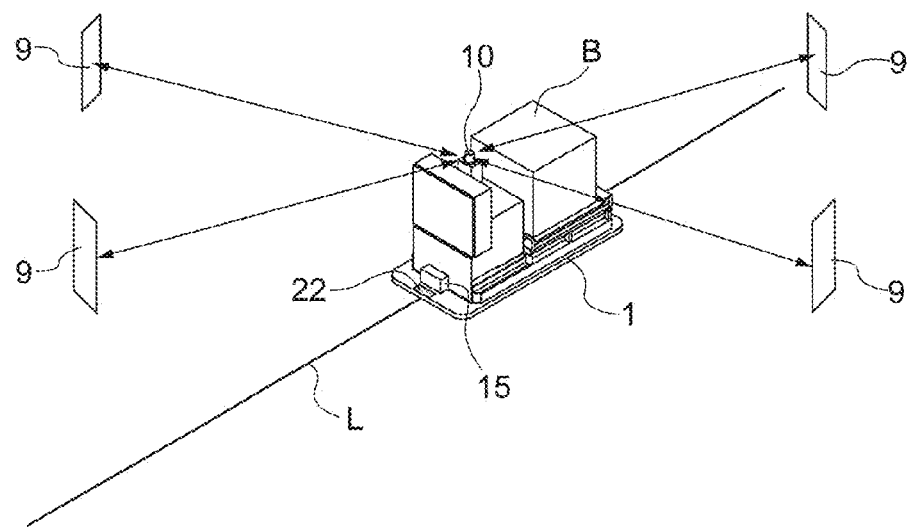
FIG. 3 is a perspective view of the article transport vehicle.

As shown in FIG. 3, the article transport facility includes a plurality of reflecting plates 9 that are located at positions that correspond to the travel path L, using walls, among other things, that are located to one or both sides of the travel path L. And provided in an upper portion of the article transport vehicle 1 is a light emitter-receiver 10 that emits Laser light in sweeping motions in a horizontal plane and that receives the reflected light reflected by the reflecting plates 9.

In addition, the article transport vehicle 1 includes a distance detector 11 for detecting, or measuring, travel distance, such as a rotary encoder, etc., that outputs pulse signals as the driven travel wheels are rotated, and a direction detector 12 such as a rate gyro that detects the direction of the article transport vehicle 1.

The emitter-receiver 10, the distance detector 11, and the direction detector 12 define a travel position detector 13 for detecting the travel position of the article transport vehicle 1. And the travel position detector 13 is mounted on, or is provided to, the article transport vehicle 1.

As shown in FIG. 2, a vehicle side controller H1 that functions as a travel controller for controlling the operation of the travel actuating portion 7 is provided to the article transport vehicle 1. The vehicle side controller H1 is configured to control the operation of the travel actuating portion 7, based on travel position information detected by the travel position detector 13 and travel command information from the ground side controller H2 which functions as a travel controller, in order to cause the article transport vehicle 1 to travel toward a target travel position along the travel path L at a target travel speed.

More specifically, the vehicle side controller H1 is configured to confirm, verify, or otherwise determine the current position of the article transport vehicle 1 based on sweep angle information of the reflected light received by the emitter-receiver 10 and position information on the plurality of reflecting plates 9, and to control the operation of the travel motor 5 and the steering motor 6 based on the current position information, the detected information from the distance detector 11, and the detected information from the direction detector 12. During this operation, the vehicle side controller H1 is configured to control the operations of the travel motor 5 and the steering motor 6 to cause the article transport vehicle 1 to travel along the travel path L at a target travel speed to the target travel position that corresponds to the station ST indicated by, or specified in, a travel command issued from the ground side controller H2.

The travel path L is an imaginary path along which the article transport vehicle 1 should travel as described above. Path information of the travel path L is stored in the vehicle side controller H1 as map data 8. And when a travel command is issued, the vehicle side controller H1 determines and sets the travel route along the travel path L.

Figure 4:
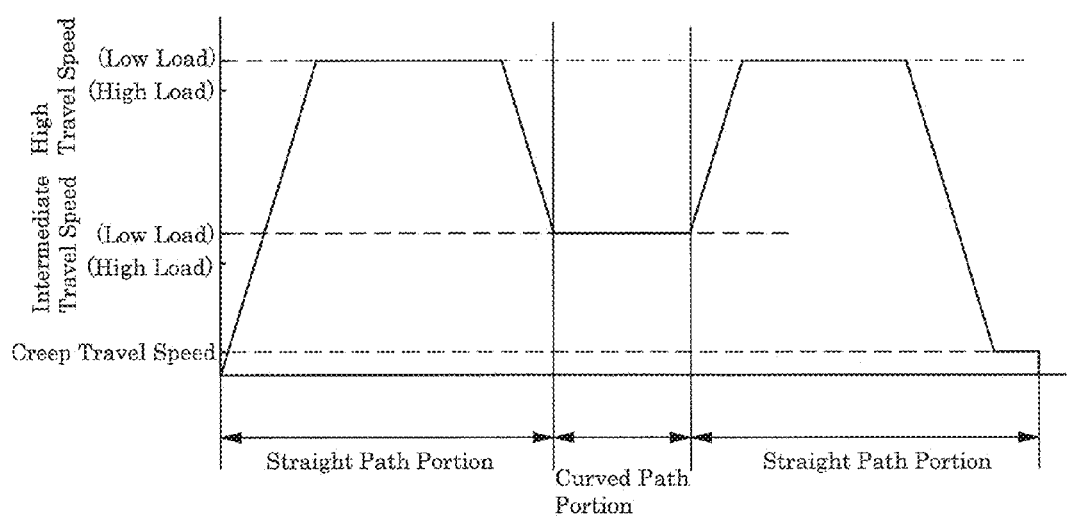
FIG. 4 is a time chart which shows changes in the target travel speed of the article transport vehicle.

As shown in FIG. 4, defined as the normal travel speed in the vehicle side controller H1 are a high travel speed for when the article transport vehicle 1 travels in a straight path portion of the travel path L, an intermediate travel speed for when the article transport vehicle 1 travels in a curved path portion of the travel path L, and a creep travel speed. In addition, a travel speed when traveling under a low load condition as well as a travel speed when traveling under a high load condition are defined for each of the high travel speed and the intermediate travel speed.

Incidentally, in the present embodiment, the high travel speed under a low load condition is set to be 200 m/min, the high travel speed under a high load condition is set to be 160 m/min, the intermediate travel speed under a low load condition is set to be 60 m/min, the intermediate travel speed under a high load condition is set to be 40 m/min, and the creep travel speed is set to be 5 m/min. Thus, these speeds are defined so that they decrease in the order from the high travel speed under a low load condition, the high travel speed under a high load condition, the intermediate travel speed under a low load condition, the intermediate travel speed under a high load condition, and to the creep travel speed.

Note that traveling under a low load condition means that the article transport vehicle 1 is traveling with no load, i.e., with the article transport vehicle supporting no article B. And traveling under a high load condition means that the article transport vehicle 1 is traveling with a load, i.e., with the article transport vehicle supporting an article.

And as shown in FIG. 4, when causing the article transport vehicle 1 to travel along the travel path L, the vehicle side controller H1 is configured to control the operation of the travel actuating portion 7 in order to cause the article transport vehicle 1 to: travel with the target travel speed set to the high travel speed when traveling in a straight path portion; to travel with the target travel speed set to the intermediate travel speed when traveling in a curved path portion; and to stop at the target stop position after causing it to decelerate to the creep travel speed.

FIG. 4 shows the target travel speed when the article transport vehicle 1 under the low load condition travels in a straight path portion, a curved path portion, and then a straight path portion in that order.

In addition, as shown in FIG. 2, the article transport vehicle 1 is provided with an interfering object sensor 15 which functions as a presence detector for detecting the presence of an interfering object located forwardly of the article transport vehicle 1 in the travel direction thereof, a sensor controller 16 which functions as an auxiliary travel controller for controlling the operation of the travel actuating portion 7 based on the detected information from the interfering object sensor 15, a bumper sensor 26 for detecting that an interfering object has contacted a bumper of the article transport vehicle 1, a power source 17 (battery) for supplying electric power to the travel actuating portion 7 (the travel motor 5 and the steering motor 6), and an electric-power interrupting portion 18 which can interrupt supply of the electric power from the power source 17 to the travel actuating portion 7.

Incidentally, an interfering object which the interfering object sensor 15 and the bumper sensor 26 detect is any object that has a possibility of interfering, colliding, or contacting the article transport vehicle 1, such as a human worker 2, a fork lift truck 3, or an article placed on the floor.

The sensor controller 16 is incorporated within the interfering object sensor 15 and is configured to determine the distance from the article transport vehicle 1 to the interfering object based on the detected information from the interfering object sensor 15 if and when the presence of an interfering object is detected by the interfering object sensor 15.

In addition, walls may be installed laterally of the travel path L. Or an article storage rack may be installed on the floor such that it would not interfere with the article transport vehicle 1 traveling along the travel path L. Or an article may be placed directly on the floor. The positions of the walls, the positions of the interfering objects currently installed on the floor, such as a rack, and the positions of the interfering objects that are scheduled to be placed on the floor, such as articles directly placed on the floor, are stored in the sensor controller 16 in advance as a layout map. And even if the interfering object sensor 15 detects an interfering object whose position is stored in advance, the sensor controller 16 is configured to cancel or nullify the detected information, and is configured not to determine that an interfering object is present.

And if and when a presence of an interfering object is detected by the interfering object sensor 15 while the target travel speed is set to the normal travel speed, the sensor controller 16 is configured to cause the article transport vehicle 1 either to decelerate by reducing the speed upper limit for the target travel speed set by the vehicle side controller H1 or to decelerate for an emergency stop by interrupting the supply of the electric power to the travel actuating portion 7 with the electric-power interrupting portion 18, depending on the distance from the article transport vehicle 1 to the interfering object that is determined based on the detected information.

To describe in more detail, as shown in FIG. 5, a long distance (for example, 20 m), an intermediate distance (for example, 8 m) which is shorter than the long distance, and a short distance (for example, 2 m) which is shorter than the intermediate distance are defined in advance as the deceleration distances in the sensor controller 16.

And defined in advance as deceleration areas are semi-circular areas or fan-shaped areas (for example, areas each having a shape of a quarter of a circular disk) that spread forwardly of the article transport vehicle 1, each of which has its center at the position of the article transport vehicle 1 and whose radii are equal to respective deceleration distances defined above. More specifically, defined in advance are a first deceleration area A1 which is a semi-circular or fan-shaped area whose radius is equal to the long distance, a second deceleration area A2 which is a semi-circular or fan-shaped area whose radius is equal to the intermediate distance, and a third deceleration area A3 which is a semi-circular or fan-shaped area whose radius is equal to the short distance.

And the sensor controller 16 is configured to transmit long distance approach information to the vehicle side controller H1 if and when an interfering object has entered the first deceleration area A1 and the distance from the article transport vehicle 1 to the interfering object is less than or equal to the long distance and is greater than the intermediate distance.

And the sensor controller 16 is configured to transmit intermediate distance approach information to the vehicle side controller H1 if and when the interfering object has entered the second deceleration area A2 and the distance from the article transport vehicle 1 to the interfering object is less than or equal to the intermediate distance and is greater than the short distance.

And if and when the interfering object has entered the third deceleration area A3 and the distance from the article transport vehicle 1 to the interfering object is less than or equal to the short distance, the sensor controller 16 is configured to control the operation of the electric-power interrupting portion 18 in order to cause the electric-power interrupting portion 18 to interrupt the electric power to the travel actuating portion 7 and to cause the article transport vehicle 1 to perform an emergency stop.

As shown in FIGS. 6 and 7, a first upper limit speed (60 m/min in the present example) which is less than the high travel speed and is equal to the medium traveling speed and a second upper limit speed (30 m/min in the present example) which is less than the intermediate travel speed are defined in the vehicle side controller H1 as reduced travel speeds.

And the vehicle side controller H1 is configured to set the upper speed limit for the target travel speed to be the first upper limit speed when the long distance approach information is received from the sensor controller 16, and to set the upper speed limit for the target travel speed to be the second upper limit speed when the intermediate distance approach information is received from the sensor controller 16.

Thus, for example, as shown in FIG. 6, if and when the upper speed limit for the target travel speed is restricted to the first upper limit speed or the second upper limit speed while the article transport vehicle 1 is traveling at the high travel speed (under a low load condition), the target travel speed of the article transport vehicle 1 is set to the upper speed limit, i.e., either the first upper limit speed or the second upper limit speed.

In addition, for example, as shown in FIG. 7, when the article transport vehicle 1 is traveling at the intermediate (under a high load condition), the target travel speed for the article transport vehicle 1 is not changed from the intermediate travel speed even if the upper speed limit of the target travel speed is restricted to the first upper limit speed. And when the upper speed limit for the target travel speed is restricted to the second upper limit speed, the target travel speed for the article transport vehicle 1 is changed to the upper speed limit, namely, the second upper limit speed.

The bumper sensor 26 is incorporated within the bumper of the article transport vehicle 1 and is a tape switch. And the electric power interrupting portion 18 interrupts the electric power to the travel actuating portion 7 if and when the bumper sensor 26 detects that an interfering object contacted the bumper.

A ground side controller H2 which issues travel commands to the article transport vehicle 1 is provided on the ground side within the article transport facility. And a transmitter-receiver 14 for mutually transmitting and receiving a variety of information is provided to each of the vehicle side controller H1 and the ground side controller H2. Here, an item being provided "on the ground side" means that the item is not provided to the article transport vehicle 1 but is provided on the floor or the ceiling of the article transport facility, or to an object such as an article storage rack, etc., which is installed in the article transport facility.

And the ground side controller H2 is configured to transmit to the vehicle side controller H1 a travel command which specifies the station ST of transport origin from which an article B is to be transported and the station ST of transport destination. The vehicle side controller H1 is configured to control the operation of the travel actuating portion 7 based on travel position information and travel command information, and to transmit travel position information for the article transport vehicle 1 to the ground side controller H2.

In addition, provided on the ground side of the article transport facility are position detector 19 for detecting the positions of interfering objects that may exist in the measurement target area E which includes the area in which the travel path L is set, and an external management server H3 which functions as an external managing portion which issues a deceleration command to the article transport vehicle 1 if and when the distance from the article transport vehicle 1 to an interfering object becomes less than or equal to a low speed distance based on position information of the interfering object from the position detector 19 and travel position information for the article transport vehicle 1.

In addition to the elements described above, the article transport facility includes, as a position measurement portion, a wireless position measuring system 21 which measures the position of the article transport vehicle 1 within the measurement target area E as well as the position of a plurality of interfering objects which can move within the measurement target area E.

As shown in FIG. 1 and FIG. 2, the wireless position measuring system 21 includes wireless tags 22, base units 23, and a tag position measuring device 24. A wireless tag 22 is carried by the article transport vehicle 1, the workers 2, and the fork lift truck 3, and is configured to output positioning wireless signals which are wireless signals for position measurement. The base units 23 are configured to receive the positioning wireless signals from the wireless tags 22 in the measurement target area E. In the present embodiment, the base unit 23 corresponds to the "wireless receiver" in the present invention. The tag position measuring device 24 performs a position measurement process in which the position of each wireless tag 22 is calculated based on the information received by the base units 23. In the present embodiment, the tag position measuring device 24 corresponds to the "position calculation portion" in the present invention. In this wireless position measuring system 21, each wireless tags 22 is configured to be able to transmit information for position measurement to the base units 23 by UWB wireless communication.

In addition, the wireless position measuring system 21 is configured to determine the position of a wireless tag 22 detected by the position measurement function to be the position of an interfering object carrying the wireless tag 22.

As shown in FIG. 1, eight base units 23 are provided in the measurement target area E. That is, in the present embodiment, a plurality of base units 23 are provided, and the plurality of base units 23 define, or form, the "receiving portion" in the present invention. The wireless position measuring system 21 manages, or oversees, the measurement target area E by dividing this area into a plurality of section areas. In the present embodiment, the measurement target area E consists of two section areas that are next to each other with a part of one section area overlapping with a part of the other section area. In other words, the measurement target area E is divided into two section areas. More specifically, first section area E1 that is an area surrounded, or defined, by the base units 231-234 and second section area E2 that is an area surrounded, or defined, by the base units 235-238 are defined such that a part of the first section area E1 overlaps with a part of the second section area E2. Thus, a section area is set up, or arranged, to function as a section reception area defined as a reception target area for a plurality of base units 23. In the present example, the reception target area for a plurality of base units 23 is defined by the area surrounded, or defined, by the plurality of base units 23.

The tag position measuring device 24 calculates the position of a wireless tag 22 based on wireless signal that is received by at least two of the base units 23 out of the four base units 23 that define the first section area E1 or the second section area E2. That is, the tag position measuring device 24 measures, or calculates, the position of a wireless tag 22 in the first section area E1 based on the wireless signal received by the base units 23 (of the base units 231-234) that are in communication with the wireless tag 22. Similarly, the position of a wireless tag 22 in the second section area E2 is measured, or calculated, based on the wireless signal received by the base units 23 (of the base units 235-238) that are in communication with the wireless tag 22. In this manner, the tag position measuring device 24 calculates the position of an interfering object for each section reception area.

The interfering objects which the wireless position measuring system 21 detects, are the workers 2 and the fork lift truck 3 each carrying the wireless tags 22. And the wireless position measuring system 21 is configured to transmit position information of the detected interfering object to the external management server H3. Incidentally, objects without the wireless tags 22, such as an article to be transported, are not detected as interfering objects by the wireless position measuring system 21.

And the information transmitted from the wireless tag 22 includes attribute information about the interfering object carrying the wireless tags 22. And the wireless position measuring system 21 is configured to determine the attribute (i.e., a worker 2 or the fork lift truck 3) of the interfering object carrying the wireless tags 22 based on the information from the wireless tag 22.

Thus, the article transport facility includes an article transport vehicle 1 which can travel within the measurement target area E, a vehicle side controller H1 which controls traveling operation of the article transport vehicle 1, and the wireless position measuring system 21 which measures, or calculates, the position of the article transport vehicle 1 within the measurement target area E as well as the positions of a plurality of interfering objects (workers 2 and the fork lift truck 3) which are located within the measurement target area E. And the vehicle control system includes, and is defined by, the article transport vehicle 1, the vehicle side controller H1, and the wireless position measuring system 21.

Each worker 2 carries a wireless tag 22 and each fork lift truck 3 carries a wireless tag 22.

In the present embodiment, the wireless position measuring system 21 manages, or keeps track of, the total number of the wireless tags 22 that are in the measurement target area E as well as identifying information for each wireless tag 22 that is in the measurement target area E. The managing portion that manages the identifying information may be provided to the base units 23, or to the tag position measuring device 24. The wireless position measuring system 21 inquires the position of each wireless tag 22 sequentially in a predetermined polling order with all of the plurality of base units 23 simultaneously transmitting polling wireless signal for inquiring the position of, and to, each of the wireless tags 22 located in each of the first section area E1 and the second section area E2 of the measurement target area E. More specifically, the polling wireless signals are transmitted simultaneously from the four base units 23 (i.e., base units 231-234 for the first section area E1 and base units 235-238 for the second section area E2). Each wireless tag 22 that receives the polling wireless signal transmits a positioning wireless signal as a response. This positioning wireless signal is received by two or more base units 23 out of the four base units 23 (i.e., base units 231-234 for the first section area E1 and base units 235-238 for the second section area E2). And the tag position measuring device 24 uses a known positioning scheme, such as TDOA and TOA, to calculate the position of the wireless tag 22. A set amount of processing time, or set processing time, (for example, tens of milliseconds) is required for the tag position measuring device 24 to calculate the position of a wireless tag 22 using a known positioning scheme, such as TDOA and TOA.

More specifically, the receiving portion (the plurality of base units 23 in the present example) of the wireless position measuring system 21 is configured to be able to receive the positioning wireless signal from only one wireless tag 22 at any one time. And the tag position measuring device 24 is configured to calculate the position of the wireless tag 22 in the first section area E1 or the second section area E2, taking the set processing time to calculate the position of each wireless tag 22.

The wireless position measuring system 21 is configured to calculate the positions of the wireless tags 22 sequentially in accordance with the polling order mentioned above for all of the wireless tags 22 that are in the first section area E1 or the second section area E2 and to perform, based on the calculated positions of the wireless tags 22, a position measurement process in which the positions of the article transport vehicle 1, the workers 2, or the fork lift truck 3 is measured, or calculated.

Therefore, at least a total processing time (or measurement cycle time), which is calculated as a product between the set amount of processing time and the number of the wireless tags 22 that are in each section area, is required to perform the position measurement process for all of the wireless tags 22 that are in the first section area E1, or for all of the wireless tags 22 that are in the second section area E2. Therefore, the greater the number of the wireless tags 22 that are in each section area, the longer the total processing time becomes. And thus, for a given wireless tag 22, the amount of time, between the time the last position calculation was performed and the time the subsequent position calculation is performed, gets longer.

As described above, the tag position measuring device 24 of the wireless position measuring system 21 performs a position measurement step which is a step of measuring the position of each of the article transport vehicle 1 and interfering objects at each elapse of a processing time by repeatedly performing the position measurement process at each elapse of the processing time.

The external management server H3 is configured to be able to set the low speed distance, for when an interfering object is located forwardly of the article transport vehicle 1 with respect to the travel direction, to be different from the low speed distance for when an interfering object is located rearwardly of the article transport vehicle 1 with respect to the travel direction.

And as shown in FIG. 5, in the present embodiment, a remote distance (for example, 25 m) and a neighboring distance (for example, 15 m) which is shorter than the remote distance are defined in the external management server H3 as the low speed distance for when an interfering object is located forwardly of the article transport vehicle 1 with respect to the travel direction. A semi-circular area whose radius is equal to the remote distance, which has its center at the position of the article transport vehicle 1, and which spreads forwardly of the article transport vehicle 1 will be referred to as a first low speed area D1. And a semi-circular area whose radius is equal to the neighboring distance, which has its center at the position of the article transport vehicle 1, and which spreads forwardly of the article transport vehicle 1 will be referred to as a second low speed area D2. The low speed distance is set to be 0 m for when an interfering object is located rearwardly of the article transport vehicle 1 with respect to the travel direction. Thus, the low speed distance for when an interfering object is located rearwardly of the article transport vehicle 1 with respect to the travel distance can be set to be less than the low speed distance for when an interfering object is located forwardly of the article transport vehicle 1.

Incidentally, the remote distance is set to be greater than the long distance and the neighboring distance is set to be less than the long distance, and greater than the intermediate distance.

And the external management server H3 is configured to transmit remote approach information to the ground side controller H2 if and when an interfering object has entered the first low speed area D1 and the distance from the article transport vehicle 1 to the interfering object is less than or equal to the remote distance and is greater than the neighboring distance, based on the position information for the interfering object transmitted from the monitoring camera (not shown) or the wireless position measuring system 21 and the travel position information for the article transport vehicle 1 from the ground side controller H2, and is configured to transmit neighboring approach information to the ground side controller H2 if and when the interfering object has entered the second low speed area D2, and the distance from the article transport vehicle 1 to the interfering object becomes less than or equal to the neighboring distance.

When the remote approach information and the neighboring approach information are received from the external management server H3, the ground side controller H2 is configured to transmit, or forward, the remote approach information and the neighboring approach information to the vehicle side controller H1.

And the vehicle side controller H1 is configured to set the upper speed limit for the target travel speed to be the first upper limit speed when it receives the remote approach information from the ground side controller H2, and to set the upper speed limit for the target travel speed to be the second upper limit speed when it receives the neighboring approach information from the ground side controller H2.

The long distance approach information and intermediate distance approach information are transmitted from the sensor controller 16 to the vehicle side controller H1, whereas the remote approach information and the neighboring approach information are transmitted from the external management server H3 to the vehicle side controller H1.

And when the article transport vehicle 1 travels toward an interfering object while traveling at a high travel speed (under the low load condition), and as the interfering object enters the first low speed area D1, first deceleration area A1, the second low speed area D2, and the second deceleration area A2 in that order and shown in FIG. 5, the upper limit speed is changed as follows.

As shown in FIG. 8, the vehicle side controller H1 changes the upper speed limit for the target travel speed to the first upper limit speed if and when the interfering object enters the first low speed area D1 and the remote approach information is transmitted from the ground side controller H2, and maintains the upper speed limit for the target travel speed at the first upper limit speed if and when the interfering object enters the first deceleration area A1 and the long distance approach information is transmitted from the sensor controller 16. In addition, the vehicle side controller H1 changes the upper speed limit for the target travel speed to the second upper limit speed if and when the interfering object enters the second low speed area D2 and the neighboring approach information is transmitted from the ground side controller H2, and maintains the upper speed limit speed for the target travel speed at the second upper limit speed if and when the interfering object enters the second deceleration area A2 and the short distance approach information is transmitted from the sensor controller 16.

Incidentally, subsequently, if and when the interfering object enters the third deceleration area A3, the sensor controller 16 controls the operation of the electric-power interrupting portion 18 to interrupt the electric power to the travel actuating portion 7 to cause the article transport vehicle 1 to perform an emergency stop.

Thus, to the vehicle side controller H1, the long distance approach information and intermediate distance approach information are transmitted from the sensor controller 16 whereas the remote approach information and neighboring approach information are transmitted from the external management server H3. And between the long distance approach information and intermediate distance approach information, the target travel speed is restricted or reduced based on the approach information that is received later of the two. Also between the remote approach information and neighboring approach information, the target travel speed is restricted or reduced based on the approach information that is received later of the two. And between the approach information from the sensor controller 16 and the approach information from the external management server H3, the approach information that leads to the lower upper speed limit is given priority when restricting, or reducing, the target travel speed.

In addition, the vehicle side controller H1 is configured to be able to determine, based on the measurement information from the wireless position measuring system 21, if the congested state exists in which the number of the wireless tags 22 that are in the section area is greater than a set upper limit number Tmax for each of the first section area E1 and the second section area E2. In other words, the vehicle side controller H1 performs a congested state determination step which is a step of determining whether the section area is in the congested state for each of the plurality of section areas. The set upper limit number Tmax is set to be the number of the wireless tags 22 for which the position calculation for each of the wireless tags 22 that are in each of the section areas can be performed at a time interval for which the difference, or discrepancy, that occurs between the position of a wireless tag 22 which the wireless position measuring system 21 acquires, or manages, and the actual position of the wireless tag 22 is such a distance that any interference between the article transport vehicle 1 traveling at the travel speed in a normal travel mode and an interfering object can be avoided.

The vehicle side controller H1 is configured to control travel of the article transport vehicle 1 in any one of a plurality of travel modes. In other words, the vehicle side controller H1 performs a travel control step which is a step in which travel of the article transport vehicle 1 is controlled in any one of a plurality of travel modes. More specifically, the vehicle side controller H1 is configured to set the travel mode to be a normal travel mode when causing the article transport vehicle 1 to travel in the section area that is determined not to be in the congested state, and to set the travel mode to be a congested area travel mode when causing the article transport vehicle 1 to travel in the section area that is determined to be in the congested state.

Here, the normal travel mode is a travel mode in which the article transport vehicle 1 is controlled to travel at the normal travel speed (high travel speed, intermediate travel speed, or creep traveling speed). And the congested area travel mode is a mode in which travel of the article transport vehicle 1 within the section area is more restricted compared with the normal travel mode. By "travel being more restricted" in the above context includes, among other things, restricting, or reducing, the upper limit travel speed of the article transport vehicle 1 in the section area at issue, and restricting (i.e., prohibiting) the article transport vehicle 1 from entering the section area at issue. In addition, in the present embodiment, the section area in which the travel is restricted is a section area that is determined to be in the congested state. And in the second embodiment described below, in addition to the section area that is determined to be in the congested state, the section area in which the travel is restricted also includes a section area which satisfies a set condition with the section area that is determined to be in the congested state. In the present embodiment, in the congested area travel mode, the upper limit travel speed of the article transport vehicle 1 is set to be a congestion upper limit travel speed which is less than the upper limit travel speed in the normal travel mode. More specifically, for the section area, between the first section area E1 and the second section area E2, that is in the congested state, the vehicle side controller H1 sets a congested area travel mode in which the article transport vehicle 1 is caused to decelerate by restricting the upper limit speed for the target travel speed set by the vehicle side controller H1 to second upper limit speed (30 m/min) which is less than any of the normal travel speeds other than the creep traveling speed (that is, less than the high travel speed and the intermediate travel speed).

That is, in the present embodiment, the vehicle side controller H1 is configured, in the congested area travel mode, to set the upper limit travel speed for the article transport vehicle 1 to be the congestion upper limit travel speed which is less than the normal travel speed (the high travel speed and the intermediate travel speed) which is the upper limit travel speed in the normal travel mode. And in the present embodiment, this congestion upper limit travel speed is set to be the second upper limit speed.

Figure 9:
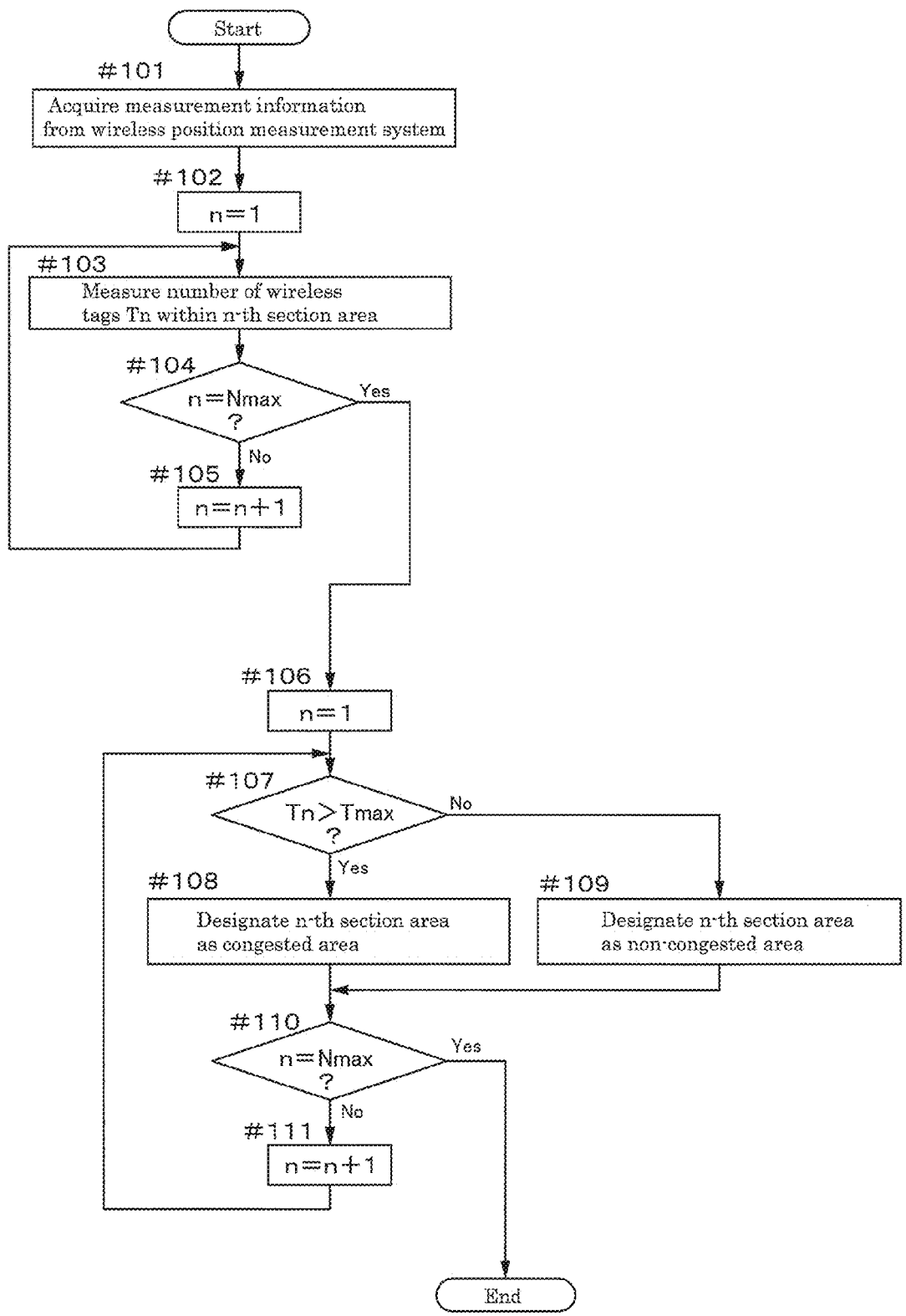
FIG. 9 is a flow chart showing how the travel control mode is selected in the first embodiment.

The process performed by the vehicle side controller H1 are described next with reference to the flow chart of FIG. 9. In the following description of the flow chart, the number of section areas that are assumed to exist is generalized to Nmax so that the description applies even when there are two or more section areas.

The vehicle side controller H1 acquires measurement information from the wireless position measuring system 21 (Step #101), and subsequently repeats a process for calculating, or obtaining, the number Tn of the wireless tags that are in the n-th section area. This process is repeated Nmax times, which is the number of existing section areas (Steps #102-#105).

When calculation of the number Tn of the wireless tags that are in a given section area in Step #103 is completed for all section areas, the vehicle side controller H1 repeats the congested state determination process for determining whether a given section area is in the congested state. This process is repeated Nmax times, which is the number of existing section areas. That is, the vehicle side controller H1 determines whether the number Tn of the wireless tags in a given section area is greater than a set upper limit number Tmax (Step #107), and repeats a process in which the section area is designated as a congested area if the number is greater than Tmax (Step #108), and in which the section area is designated as a non-congested area if the number is not greater than (i.e., less than or equal to) Tmax (Step #109). This process is repeated Nmax times, which is the number of existing section areas (Steps #106-#111).

In this manner, each of the plurality of section areas is designated either as a congested area or a non-congested area depending on the number of the wireless tags 22 that are in the section area. And for the section area designated as a congested area, the vehicle side controller H1 changes, or switches, the travel mode to cause the article transport vehicle 1 to travel at a low speed when the article transport vehicle 1 is about to travel in the section area, or when the article transport vehicle 1 is already in the section area. That is, the vehicle side controller H1 changes, or switches, the travel mode of the article transport vehicle 1 from the normal travel mode to the congested area travel mode. Therefore, any interference between an interfering object and the article transport vehicle 1 can be avoided even when the section area which the article transport vehicle 1 is already in, or is about to travel through, is a congested area.

Second Embodiment

Second embodiment of the present invention is described next. Since this second embodiment is different from the first embodiment only in the configuration of the section areas and the processes performed by the vehicle side controller H1, only the differences from the first embodiment are described, omitting the description of identical elements.

Figure 10:
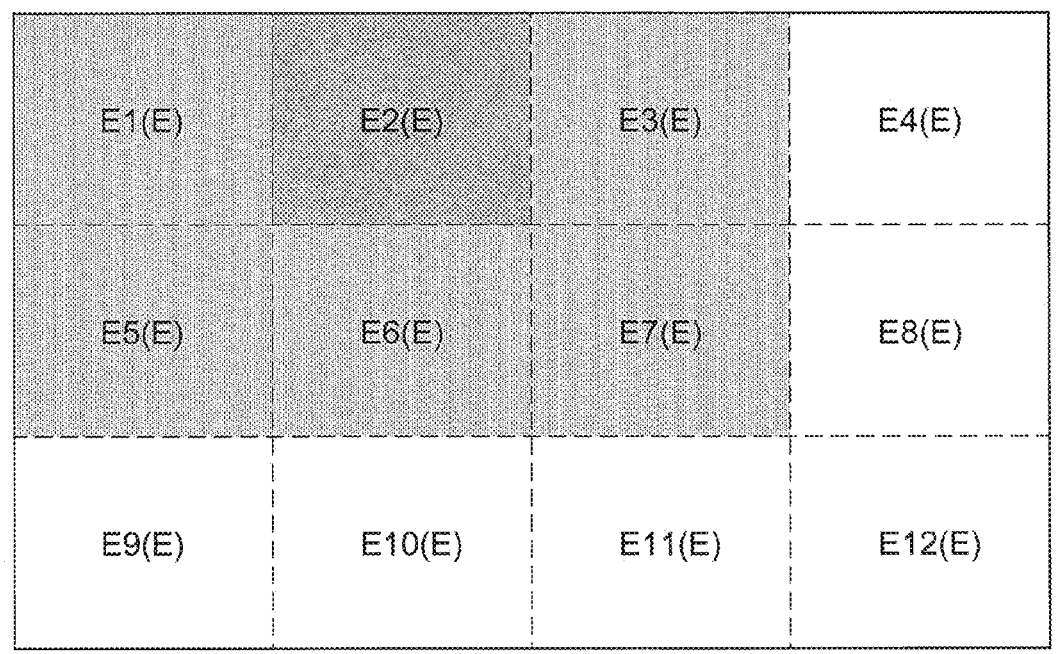
FIG. 10 is a diagram showing how the section areas in the second embodiment are defined, and the areas in which the vehicle is caused to travel in the congested travel mode.

As shown in FIG. 10, the measurement target area E is divided into first section area E1 to 12th section area E12 in the second embodiment. Although the number of divided section areas is "12" in the present embodiment, this number is not limited to "12", and can be any suitable number. In addition, to change the number of divided section areas, it is necessary to properly set the number of the base units 23 to be installed as well as the locations for installing these base units 23. More specifically, the base units 23 are arranged such that four base units 23 are associated with, and define, each section area and such that parts of adjoining section areas overlap each other.

In the second embodiment, the vehicle side controller H1 is configured to select the congested area travel mode as the travel mode even if the section area which the controller H1 is about to cause the vehicle to travel into is not a section area that is determined to be in the congested state, but if the section area adjoins a section area that is determined to be in the congested state.

This is described using an example illustrated by the schematic diagram of FIG. 10. It is assumed that the 2nd section area E2 shown with darker shades in FIG. 10 is in the congested state. Then the section areas that adjoin the 2nd section area E2, namely the 1st section area E1, the 3rd section area E3, the 5th section area E5—the 7th section area E7 (shown with lighter shades in FIG. 10) are section areas which interfering object(s) may move into from the 2nd section area E2 which is in the congested state. Thus, even if the 1st section area E1, the 3rd section area E3, the 5th section area E5—the 7th section area E7 are not in the congested state at some point in time, the 1st section area E1, the 3rd section area E3, the 5th section area E5—the 7th section area E7 may come to be in the congested state through movement of an interfering object from the 2nd section area E2.

Accordingly, the vehicle side controller H1 selects the congested area travel mode as the travel mode to for the section areas that adjoin the 2nd section area E2 which is in the congested state, namely the 1st section area E1, the 3rd section area E3, the 5th section area E5—the 7th section area E7.

Figure 11:
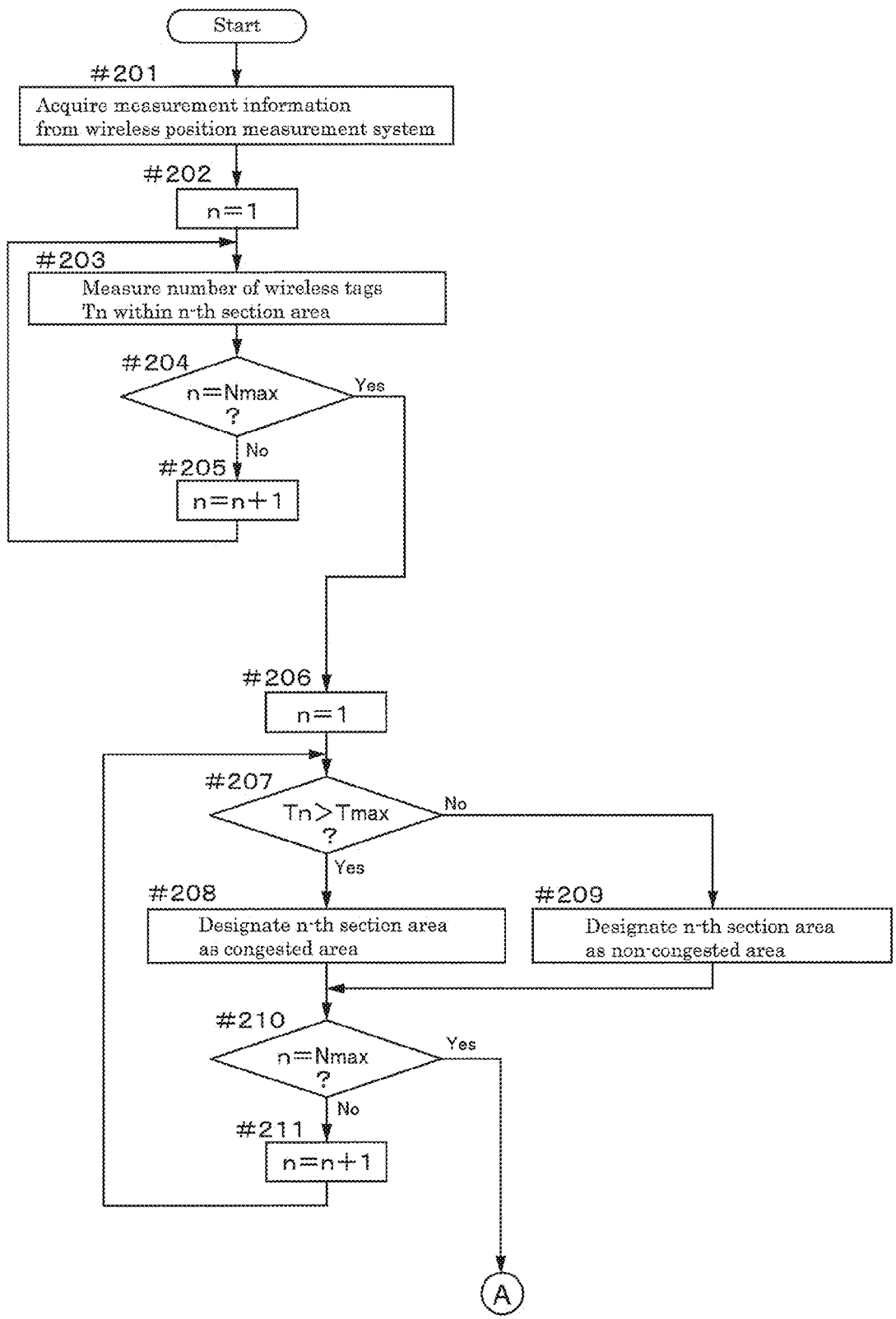
FIG. 11 is a flow chart showing how the travel control mode is selected in the second embodiment.

The process performed by the vehicle side controller H1 are described next with reference to the flow chart of FIG. 11.

The vehicle side controller H1 acquires measurement information from the wireless position measuring system 21 (Step #201), and subsequently repeats a process for calculating, or obtaining, the number Tn of the wireless tags that are in the n-th section area. This process is repeated Nmax times, which is the number of existing section areas (Steps #202-#205).

When calculation of the number Tn of the wireless tags that are in a given section area in Step #203 is completed for all section areas, the vehicle side controller H1 repeats the congested state determination process for determining whether a given section area is in the congested state. This process is repeated Nmax times, which is the number of existing section areas. That is, the vehicle side controller H1 determines whether the number Tn of the wireless tags in a given section area is greater than a set upper limit number Tmax (Step #207), and repeats a process in which the section area is designated as a congested area if the number is greater than Tmax (Step #208), and in which the section area is designated as a non-congested area if the number is not greater than (i.e., less than or equal to) Tmax (Step #209). This process is repeated Nmax times, which is the number of existing section areas (Steps #206-#211).

Subsequently, the vehicle side controller H1 determines if the n-th section area adjoins a section area that is designated to be a congested area in step #208, and changes the designation of this section area to a congestion preparatory area (Steps #213, #214) if the section area is determined to adjoin a section area that is designated to be a congested area. Also, the designation of the n-th section area is maintained to be a non-congested area if the section area is determined not to adjoin a section area that is designated to be a congested area. The vehicle side controller H1 repeats the processes of Steps #213 and #214 by the number (Nmax) of the section areas (Steps #212-#216).

In this manner, each of the plurality of section areas is designated to be one of a congested area, a congestion preparatory area, and a non-congested area. For the section area that is designated to be a congested area or the congestion preparatory area, the vehicle side controller H1 changes, or switches, the travel mode to cause the article transport vehicle 1 to travel at a low speed when the article transport vehicle 1 is about to travel in the section area, or when the article transport vehicle 1 is already in the section area. That is, the vehicle side controller H1 changes, or switches, the travel mode of the article transport vehicle 1 from the normal travel mode to the congested area travel mode. Therefore, any interference between an interfering object and the article transport vehicle 1 can be avoided even when the section area which the article transport vehicle 1 is already in, or is about to travel through, is a congested area or a congestion preparatory area which adjoins a congested area.

That is, when vehicle side controller H1 is about to cause the article transport vehicle 1 to travel in a section area which satisfies a set condition with the section area that is determined to be the congested state, the vehicle side controller H1 is configured to set the travel mode to the congested area travel mode even if the section area that the article transport vehicle 1 is about to be caused to travel is a section area which is not determined to be the congested state. And in the present embodiment, this set condition is that the given section area adjoins a section area that is determined to be in the congested state.

Alternative Embodiments (1) In the embodiments described above, an example is described in which, in the congested area travel mode, a travel mode is selected in which the upper limit speed of the target travel speed set by the vehicle side controller H1 is reduced to cause the article transport vehicle 1 to decelerate. However, the invention is not limited to this configuration. For example, entry of the article transport vehicle 1 into a section area that is determined to be in the congested state may be restricted in the congested area travel mode. In this case, for example, as shown in FIG. 1, first shortcut path LS1 which short-circuits the travel path L to allow the article transport vehicle 1 to circulate within the first section area E1 and second shortcut path LS2 which short-circuits the travel path L to allow the article transport vehicle 1 to circulate within the second section area E2 may be set to the travel path L that allows the article transport vehicle 1 to circulate around the whole measurement target area E. And the article transport vehicle 1 is caused to circulate in a portion of the travel path L that is in the first section area E1 and the first shortcut path LS1 if entry of the article transport vehicle 1 into the second section area E2 is restricted when the article transport vehicle 1 is in the first section area E1. And the article transport vehicle 1 is caused to circulate in a portion of the travel path L that is in the second section area E2 and the second shortcut path LS2 if entry of the article transport vehicle 1 into the first section area E1 is restricted when the article transport vehicle 1 is in the second section area E2. In addition, another example in which entry of the article transport vehicle 1 into the section area that is determined to be in the congested state is restricted, and which does not involve causing the article transport vehicle 1 circulate by causing it to travel through the first shortcut path LS1 or the second shortcut path LS2, is one in which the travel path of the article transport vehicle 1 can be changed to a path other than a path which extends within the section area that is determined to be in the congested state, for example, by installing a bypass path that allows the article transport vehicle 1 to detour.

Yet another example in which entry of the article transport vehicle 1 into the section area that is determined to be in the congested state is restricted is one in which the vehicle side controller H1 is configured to stop the article transport vehicle 1 which is about to enter, or is already in, the section area that is determined to be in the congested state.

(2) In the embodiments described above, the wireless position measuring system 21 forms, or functions as, the position measurement portion. However, the position measurement portion may be any other device or system that can measure the position of the article transport vehicle 1, and the positions of interfering objects (workers 2 and the fork lift truck 3). For example, any device or system that can measure the position of the article transport vehicle 1, and the positions of interfering objects (workers 2 and the fork lift truck 3) based on still or moving images that are captured by a camera.

(3) In the embodiments described above, in the congested area travel mode, an example is described in which the upper limit speed for the target travel speed set by the vehicle side controller H1 is restricted to the second upper limit speed to cause the article transport vehicle to decelerate. However, the upper limit speed for the target travel speed may be set to the first upper limit speed, or any other speed.

(4) In the embodiments described above, an example is described in which the wireless position measuring system 21 measures the positions of the wireless tags 22 carried by the workers 2 and the fork lift truck 3. However, each article B to be transported may carry a wireless tag 22. Even in such case, if and when there are too many of the wireless tags 22 in each section area, the disadvantage may occur in which it becomes impossible to manage, or keep track of, the positions of the articles B being transported. However, it becomes possible to avoid any interference between the article transport vehicle 1 and an interfering object to the extent possible by selecting the congested area travel mode for a section area that is determined to be in the congested state as described above.

(5) In the first embodiment described above, an example was described in which there are two section areas. However, there may be three or more section areas. Also, in the embodiments described above, an example is described in which the vehicle side controller H1 controls travel of the article transport vehicle 1. However, the subject of the control by the vehicle side controller H1 does not have to be limited to travel of the article transport vehicle 1. For example, the vehicle side controller H1 may also control a work vehicle that performs operations other than transporting of articles. In addition, although the article transport vehicle 1 is an autonomous vehicle in the embodiments described above, it may be a manned work vehicle that performs operation with a worker onboard.

(6) In the second embodiment described above, the set condition for switching a designation of a given section area to a congestion preparatory area is that the section area adjoins the section area that is determined to be in the congested state. However, the invention is not limited to this configuration. For example, if a given section area is such that the area does not adjoin another section area in the direction of the travel path for the article transport vehicle 1 but such that an interfering object in the another section area can move into the given section area, then the given section area may be designated to be a congestion preparatory area. More specifically, it is contemplated, for example, that if two section areas which are separated by a wall and which do not adjoin each other in the direction of the travel path for the article transport vehicle 1 are such that a worker 2 can freely move between the two section areas through an opening, such as a door provided in the wall, then if and when one section area becomes the congested state, the other section area is designated to be a congestion preparatory area. It is also contemplated that if the measurement target area E is arranged such that the travel paths for the article transport vehicle 1 exist on a number of floors, and such that a worker 2 can move between two section areas, that exits on different floors, by means of stairs or a ladder, then if and when one section area becomes the congested state, the other section area is designated to be a congestion preparatory area.

What is claimed is:

1. A vehicle control system comprising:
   a vehicle capable of traveling in a measurement target area;
   a travel controller which controls travel of the vehicle;
   a position measurement portion which measures a position of the vehicle within the measurement target area and positions of a plurality of interfering objects within the measurement target area;
   wherein the travel controller is configured to control travel of the vehicle based on position information of the vehicle in the measurement target area and position information of the plurality of the interfering objects, measured by the position measurement portion,
   wherein the position measurement portion is configured to manage the measurement target area by dividing the measurement target area into a plurality of section areas, and is configured to manage an intra-area interfering object number, which is the number of interfering objects in a section area, independently for each of the plurality of the section areas, and
   wherein the travel controller is configured: to control travel of the vehicle in any one of a plurality of travel modes; to determine, independently for each of the plurality of section areas, if the section area is in a congested state in which the intra-area interfering object number is greater than a set upper limit number, based on the measurement information from the position measurement portion;
   wherein the travel controller is configured to select a normal travel mode as the travel mode when the travel controller is about to cause the vehicle to travel in the section area that is determined to be not in the congested state, and to select a congested area travel mode as the travel mode when the travel controller is about to cause the vehicle to travel in the section area that is determined to be in the congested state, and
   wherein in the congested area travel mode, the travel controller is configured to set an upper limit travel speed for the vehicle to a congestion upper limit travel speed which is less than an upper limit travel speed in the normal travel mode.

2. The vehicle control system as defined in claim 1, wherein
   the travel controller is configured to select the congested area travel mode as the travel mode when the travel controller is about to cause the vehicle to travel in the section area that satisfies a set condition with the section area that is determined to be in the congested state even if the section area in which the travel controller is about to cause the vehicle to travel is the section area that is determined not to be in the congested state.

3. The vehicle control system as defined in claim 1, wherein position measurement portion includes:

wireless tags each of which can output a positioning wireless signal which is a wireless signal for position measurement, and each of which is carried by each of the vehicle and the plurality of the interfering objects;

a receiving portion configured to be able to receive the positioning wireless signals from a plurality of the wireless tags that are in the measurement target area such that the receiving portion can receive the positioning wireless signal from only one wireless tag at any one time; and a position calculation portion which calculates positions of the wireless tags in the measurement target area based on received information from the receiving portion, requiring a set processing time to calculate the position of any one of the wireless tags, and wherein the position measurement portion is configured to measure the position of the vehicle and the plurality of the interfering objects at each elapse of a processing time by repeatedly performing a position measurement process in which the position of each of the vehicle and the interfering objects in the measurement target area is measured at each elapse of the processing time.

4. The vehicle control system as defined in claim 3, wherein the receiving portion includes a plurality of wireless receivers, wherein each of the section area is arranged to be a section reception area which is a reception target area for a plurality of the wireless receivers, and wherein the position calculation portion is configured to calculate the position of each of the vehicle and the interfering objects, for each of the section reception areas.

5. The vehicle control system as defined in claim 1, wherein the interfering object is a movable body that is movable within the measurement target area.

6. The vehicle control system as defined in claim 1, wherein in the normal travel mode, the travel controller is configured to cause the vehicle to travel at a straight path travel speed when the vehicle travels in a straight path, and to cause the vehicle to travel at a curved path travel speed which is less than the straight path travel speed when the vehicle travels a curved path, and the travel controller is configured to set the congestion upper limit travel speed in the congested area travel mode to a speed further less than the curved path travel speed in the normal travel mode.

7. The vehicle control system as defined in claim 1, wherein the vehicle includes a distance sensor configured to measure a distance to the interfering object, in the normal travel mode, the travel controller is configured to: cause the vehicle to travel at a normal travel speed, when the distance to the interfering object detected by the distance sensor is greater than a first distance; to cause the vehicle to travel at a first upper limit speed which is less than the normal travel speed, when the distance to the interfering object is the first distance or less and is greater than a second distance which is less than the first distance; and to cause the vehicle to travel at a second upper limit speed which is less than the first upper limit speed, when the distance to the interfering object is the second distance or less and is greater than a third distance which is less than the second distance, and the travel controller is configured to set the congestion upper limit travel speed in the congested area travel mode to a speed equal to the second upper limit speed in the normal travel mode.

8. A vehicle control method utilizing a vehicle control system, the vehicle control system including a vehicle capable of traveling in a measurement target area, a travel controller which controls travel of the vehicle, and a position measurement portion which measures a position of the vehicle within the measurement target area and positions of a plurality of interfering objects within the measurement target area, wherein the travel controller is configured to control travel of the vehicle based on position information of the vehicle in the measurement target area and position information of the plurality of the interfering objects, measured by the position measurement portion, wherein the position measurement portion is configured to manage the measurement target area by dividing the measurement target area into a plurality of section areas, and is configured to manage an intra-area interfering object number, which is the number of interfering objects in a section area, independently for each of the plurality of the section areas, the travel vehicle control method comprising the following steps that are performed by the travel controller:

a travel control step in which travel of the vehicle is controlled in any one of a plurality of travel modes;

a congested state determining step in which whether the section area is in a congested state, in which the intra-area interfering object number is greater than a set upper limit number, is determined independently for each of the plurality of section areas, based on the measurement information from the position measurement portion, wherein, in the travel control step, a normal travel mode is selected as the travel mode when the vehicle is about to be caused to travel in the section area that is determined to be not in the congested state, and a congested area travel mode is selected as the travel mode when the vehicle is about to be caused to travel in the section area that is determined to be in the congested state, and in the travel control step, in the congested area travel mode, an upper limit travel speed for the vehicle is set to a congestion upper limit travel speed which is less than an upper limit travel speed in the normal travel mode.

9. The vehicle control method as defined in claim 8, wherein in the travel control step, the congested area travel mode is selected as the travel mode when the vehicle is about to be caused to travel in the section area that satisfies a set condition with the section area that is determined to be in the congested state even if the section area in which the vehicle is about to be caused to travel is the section area that is determined not to be in the congested state.

10. The vehicle control method as defined in claim 8, wherein the position measurement portion includes:

wireless tags each of which can output a positioning wireless signal which is a wireless signal for position measurement, and each of which is carried by each of the vehicle and the plurality of the interfering objects;

a receiving portion configured to be able to receive the positioning wireless signals from a plurality of the wireless tags that are in the measurement target area such that the receiving portion can receive the positioning wireless signal from only one wireless tag at any one time; and a position calculation portion which calculates positions of the wireless tags in the measurement target area based on received information from the receiving portion, requiring a set processing time to calculate the position of any one of the wireless tags, and wherein the vehicle control method further comprises the following step that is performed by the position calculation portion:

a position measurement step in which the position of the vehicle and the plurality of the interfering objects is measured at each elapse of a processing time by repeatedly performing a position measurement process in which the position of each of the vehicle and the interfering objects in the measurement target area is measured at each elapse of the processing time.

11. The vehicle control method as defined in claim 10, wherein the receiving portion includes a plurality of wireless receivers, wherein each of the section area is arranged to be a section reception area which is a reception target area for a plurality of the wireless receivers, and wherein, in the position measurement step, the position of each of the vehicle and the interfering objects is calculated for each of the section reception areas.

12. The vehicle control method as defined in claim 8, wherein the interfering object is a movable body that is movable within the measurement target area.

* * * * *